United States Patent [19]
Hardwick

[11] Patent Number: 5,261,591
[45] Date of Patent: Nov. 16, 1993

[54] METHOD OF EXPLOSIVELY BONDING COMPOSITE METAL STRUCTURES

[75] Inventor: Roy Hardwick, Troon, Scotland

[73] Assignee: Imperial Chemical Industries PLC, London, England

[21] Appl. No.: 683,791

[22] Filed: Apr. 11, 1991

[30] Foreign Application Priority Data

Apr. 11, 1990 [GB] United Kingdom ............... 9008273

[51] Int. Cl.$^5$ ............................................. B23K 20/08
[52] U.S. Cl. ...................................... 228/107; 228/131; 228/156; 228/175; 228/265
[58] Field of Search ............... 228/107, 141.1, 156, 228/265, 108, 109, 131, 175

[56] References Cited

U.S. PATENT DOCUMENTS

| | | | |
|---|---|---|---|
| 3,140,537 | 7/1964 | Popoff | 228/108 |
| 3,645,435 | 2/1972 | Doherty | 228/107 X |
| 4,162,758 | 7/1979 | Mikarai | 228/131 |
| 4,518,111 | 5/1985 | Hardwick | 228/175 X |
| 4,756,464 | 7/1988 | Hardwick | 228/107 |
| 5,005,756 | 4/1991 | Muggeo | 228/265 X |

FOREIGN PATENT DOCUMENTS 55-73419  6/1980  Japan .................. 228/156
2209978   5/1989  United Kingdom .
2209979   6/1989  United Kingdom .

OTHER PUBLICATIONS

"A Fabrication Process for the Production of a Zirconium Bimetal Tube for Cl$_2$ and H$_2$6 Gas Wells", Hardwick, et al (1986) pp. 189–194.

Primary Examiner—Kenneth J. Ramsey
Attorney, Agent, or Firm—Cushman, Darby & Cushman

[57] ABSTRACT

This invention relates to a method of manufacturing bi-metallic tubing by the successive steps of explosive bonding, hot extrusion and co-extrusion. Bi-metallic tubing, having an inner wall made from a corrosion resistant material, is of particular use in the oil and gas industries. The invention offers a number of advantages over previously known manufacturing methods, such as increased cladding capacity, reduction in the number of joints required, and an improvement in dimensional accuracy. These are achieved by explosively bonding a tube 3 of a first metal to a substantially incompressible billet 1 of a second metal. A length of the bonded composite 15 so formed is subsequently hot extruded to form a bi-metal shell 25. A length of the shell 25 is then placed within the bore of a hollow billet 33, the interface 35 formed between the shell 25 and billet 25 sealed, and the assembled composite 39 so formed co-extruded to form a bi-metal tube 41.

5 Claims, 3 Drawing Sheets

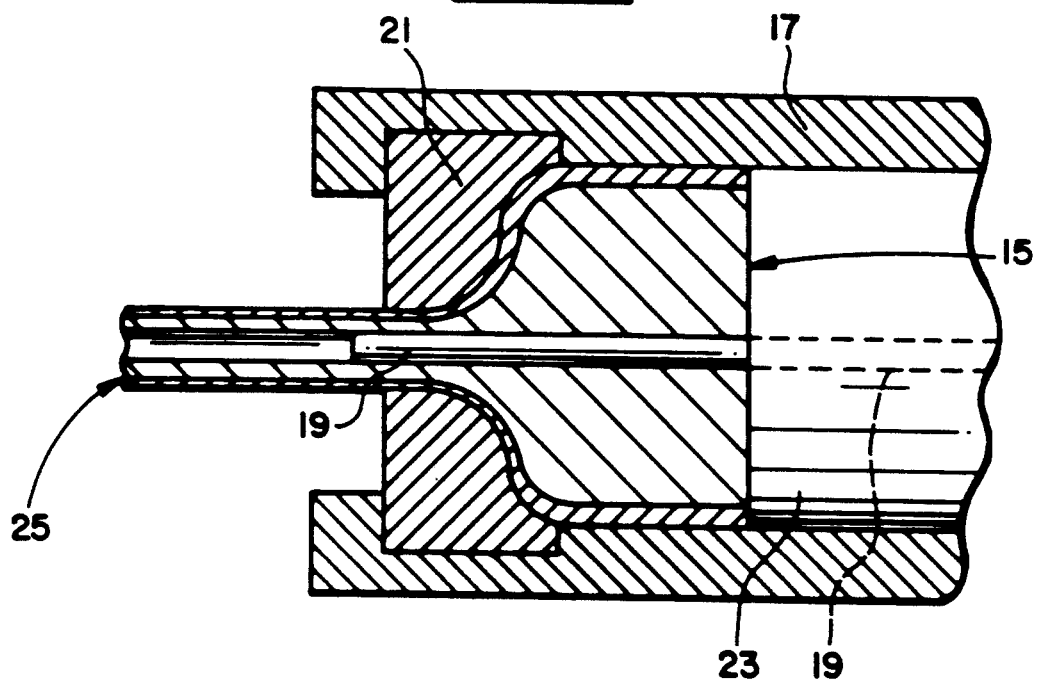
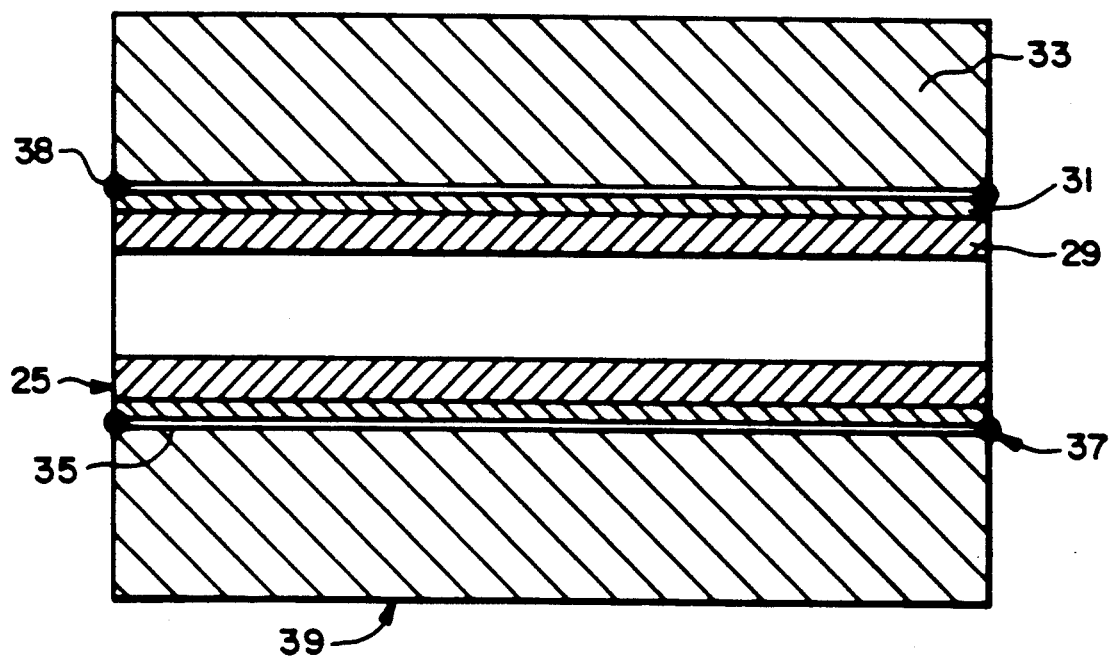

METHOD OF EXPLOSIVELY BONDING COMPOSITE METAL STRUCTURES

BACKGROUND OF THE INVENTION

1. Field of the Invention

This invention relates to a method of manufacturing bi-metallic tubing by the successive steps of explosive bonding, hot extrusion and co-extrusion. The invention specifically relates to such a method for use in the manufacture of bi-metallic tubing wherein the inner wall of the tube is made from a corrosion resistant material.

2. Description of the Prior Art

There is a considerable requirement for bi-metallic specifically for use in drill pipe and distribution pipeline in the oil and gas industries. Conventionally, such tubes consist of a principal metallic tube made from a first metal to which is bonded a metallic layer made from a second metal, the second metal being a more expensive, corrosion, resistant material. The use of such tubing leads to the reduction of costs by removing the need to manufacture corrosion resistant tubing which would be more expensive were it to consist entirely of the more expensive material and be made in a wall thickness which is sufficient to meet normal pressure requirements. The corrosion resistant layer may be within the tube bore, on the outer surface, or both. In normal uses, however, the corrosion resistant layer will be on the inner surface of the tube through which the corrosive material passes.

Co-extrusion is the predominant method of manufacture of this type of tube. This method consists of placing a first tube of corrosion resistant metal into the bore of a second and much thicker walled tube of less expensive metal, usually steel. The external diameter of the outer tube will be a close fit into the container of an extrusion press and will typically be some 300 mm to 400 mm in dimension. The internal bore will vary and be dependent upon the press mandrel being used to produce the specific bore of the extruded 'shell' to be formed. The length of the loose composite, i.e. first and second tubes, will be that required for the container of the extrusion press, and the proportional wall thickness of the two metallic tubes will be identical to that desired in the final tube to be produced.

The interface of the tubes is sealed prior to heating the composite billet which is then extruded. On extrusion, the two metals become bonded at the interface.

The principal limitation of this process is that, to be successful, the two metals being used must be compatible. Compatibility is usually associated with a small differential in the mechanical properties and atomic spacing of the two metals. This production route thus limits the choice of metals which can be used.

An alternative method of producing the bi-metal tube is by explosive bonding. This method is implemented by placing a corrosion resistant tube within a steel tube and centralizing the two tubes. The outside and inside diameters of the inside and outside tubes respectively are dimensioned such that, on centralizing the two tubes, an annular gap is produced. From this point the method continues via one of two methods, i.e. expansion or implosion.

These methods are outlined in UK Patent Nos. 2,209,978 and 2,209,979 and in "A Fabrication Process for the Production of a Zirconius Bimetal Tube for Cl$_2$ and H$_2$S Gas Wells", by R. Hardwick and C. T. Wang, in the Proceedings of the High Energy Rate Forming Conference, 1984, pp 189–194.

UK 2,209,978 relates to a method of forming bi-metal tubing by explosive bonding by expansion of a tubular component into engagement with a surrounding metal component. In this method an explosive charge is disposed axially and fired within a shock wave-transmitting insert located within the portion of the tubular metal component to be expanded, the shock wave-transmitting insert comprising a hollow cylindrical container fitting closely within the portion of the tubular metal component to be expanded and having charge-holding means to accommodate the explosive charge and locate it axially within the container, the container being filled with a shock wave-transmitting liquid.

UK 2,209,979 describes a method of forming bi-metal tubing as described in UK 2,209,978 wherein the outer tube is supported by a metal die member, surrounded by liquid.

Hardwick and Wang describes a process of producing zirconium/steel bi-metal tubes by explosive bonding by implosion, using an external annular charge, of a steel outer tube directly, and without an interlayer, to a zirconium inner tube to form a bonded shell. The bonded shell is then co-extruded within a hollow steel billet to form an extruded shell of zirconium lined steel of the requisite wall thickness proportions. The extruded shell is then further processed by a tube reducer, to the final tube size.

Hardwick and Wang also outline the process of producing bi-metal tubes by explosion, rather than implosion.

Material compatibility is not a limitation of explosive bonding as is the case in the method of co-extrusion. There are, however, limitations to the methods of explosive bonding by expansion or implosion disclosed in the prior art referred to above.

In the method of expansion, for example, the inner tube bore defines the volume of explosive which can be contained within it. If the wall thickness of the inner tube is sufficiently thick, a situation will arise where the tube bore cannot contain sufficient explosive to achieve bonding. This therefore defines a relationship between the tube bore, the wall thickness, and the material used.

Further, the outer tube wall thickness should be sufficiently thick if the outer tube itself is not to be expanded by the explosive charge. Should expansion of the outer tube occur, not only is dimensional control lost but the collision pressure occurring at the interface between the tubes is reduced, so leading to reduced bond quality. This problem may be overcome by use of an external die, as suggested in GB A 2,209,979. However this solution is time consuming, labor intensive and expensive.

A further disadvantage of the expansion method is that the detonation rate of the explosive is accelerated by the progressive increase in pressure within the tube bore. A situation may therefore occur where the detonation rate increases to a point beyond the upper limit for bonding. Consequently the length of tube which may be bonded by the expansion method is limited.

The method of implosion also suffers from a number of disadvantages. For example, the wall thickness of the outer tube being imploded is limited.

Further, in order to ensure bonding, the interfacial annular gap should be a minimum of around 20% of the outer wall thickness. Thus, if the outer wall is thick the gap will be substantial, and a situation will arise where the degree of contraction required of the outer tube is excessive. Surface wrinkling may therefore occur to depths which will not be removed by the bonding process, the control of such wrinkling being essential to the explosive bonding process.

A further disadvantage of the implosion method previously used is that the upper limit of tube length which can practically be achieved is 3–4 meters. This is due to the difficulty in attaining a uniform explosive density along the length of the annular charge. Variations in explosive density may affect the detonation velocity and so cause the detonation front passing down the annular gap to be destabilized, and increasingly distorted as a function of distance. This continues until the associated collision front at the interface below the detonation front is no longer travelling exclusively in a longitudinal direction but also circumferentially in opposing directions. When these opposing fronts meet at a diametrically opposite point, adiabatic compression of air in front of the collision front causes excessive melting of the surface preventing metal-to-metal bonding and also causing potential rupture of the inner tube.

Both the expansion and implosion methods are relatively expensive as they are extremely labor intensive. Further, the length limitations mean tube lengths are short, thus resulting in a high frequency of joints in an extended pipeline.

The explosion method disclosed by Hardwick and Wang overcomes some of the above problems by cladding of a steel layer onto the outer surface of a zirconium tube to form a composite shell, the shell then being placed in a steel bolster billet and hot co-extruded. This method enables lengths of tubing each typically of 12 meters in length to be produced from a single explosion, thereby increasing the total length of tubing available from a single explosion by a factor of 12 over previous explosive methods.

SUMMARY OF THE INVENTION

An object of the present invention is to further increase the length of tubing available from a single explosion, e.g. by a factor of 3 over the above described situation disclosed by Hardwick and Wang, i.e. by a factor of 36 over the conventional explosion method.

It is a further object of the invention to obviate or mitigate the aforementioned disadvantages of existing extrusion, explosive and implosive techniques.

It is yet a further object of the invention to provide an accurately dimensioned composite shell in the coextrusion stage rather than a rough surfaced composite shell direct from the explosive bonding stage.

Accordingly the present invention provides a method for producing a bi-metal tube wherein the interior cylindrical surface of a tube of a first metal is explosively bonded to the exterior cylindrical surface of a substantially incompressible billet of a second metal by implosion of the tube of the first metal onto the substantially incompressible billet to form a cylindrical bonded composite, a length of the section cylindrical bonded composite subsequently being hot extruded at an elevated temperature to form an extruded bi-metal shell, a length of the extruded shell subsequently being placed within the bore of a hollow billet of metal compatible with the first metal so as to form an annular interface between the exterior cylindrical surface of the shell and the interior cylindrical surface of the hollow billet, the annular interface subsequently being sealed so as to form an assembled composite, the composite then being co-extruded at an elevated temperature to form a bi-metal tube. The exterior surface of the extruded bi-metal shell may conveniently fit loosely into the interior surface of the hollow billet leaving if desired a gap at the interface.

According to another aspect of the invention there is provided a bi-metal tube made from the process given above.

The substantially incompressible billet of the second metal may be a solid cylinder or a thick walled tube.

Preferably the second metal is a corrosion resistant metal.

Preferably also, the corrosion resistant metal is a high nickel alloy.

The outer metal layer of the extruded shell and the metal of the hollow billet may be the same metal, e.g. steel, or may be dissimilar but compatible for bonding to each other during extrusion at an elevated temperature.

According to another aspect of the present invention there is provided a method for producing an extruded bi-metal shell wherein the interior cylindrical surface of a tube of a first metal is explosively bonded to the exterior cylindrical surface of a substantially incompressible billet a second metal by implosion of the tube of the first onto the substantially incompressible billet to form a cylindrical bonded composite, a length of the cylindrical bonded composite subsequently being hot extruded at an elevated temperature to form the extruded bi-metal shell.

A bi-metal tube may then be produced from a length of the extruded shell which is subsequently placed within the bore of a hollow billet of metal compatible with the first metal so as to form an annular interface between the exterior cylindrical surface of the shell and the interior cylindrical surface of the hollow billet, the annular interface subsequently being sealed so as to form an assembled composite, the composite then being co-extruded at an elevated temperature to form the bi-metal tube.

BRIEF DESCRIPTION OF THE DRAWINGS

The invention will now be described, by way of example only, with reference to the accompanying drawings in which:

FIG. 2—is a side cross-sectional view of a length of a cylindrical bonded composite being hot extruded to form an extruded shell in accordance with a further step of the method of the present invention;

FIG. 3—is a side cross-sectional view of an assembled composite comprising a length of the extruded shell within the bore of a hollow billet.

DETAILED DESCRIPTION OF THE PRESENTLY PREFERRED EXEMPLARY EMBODIMENTS

Figure 1:
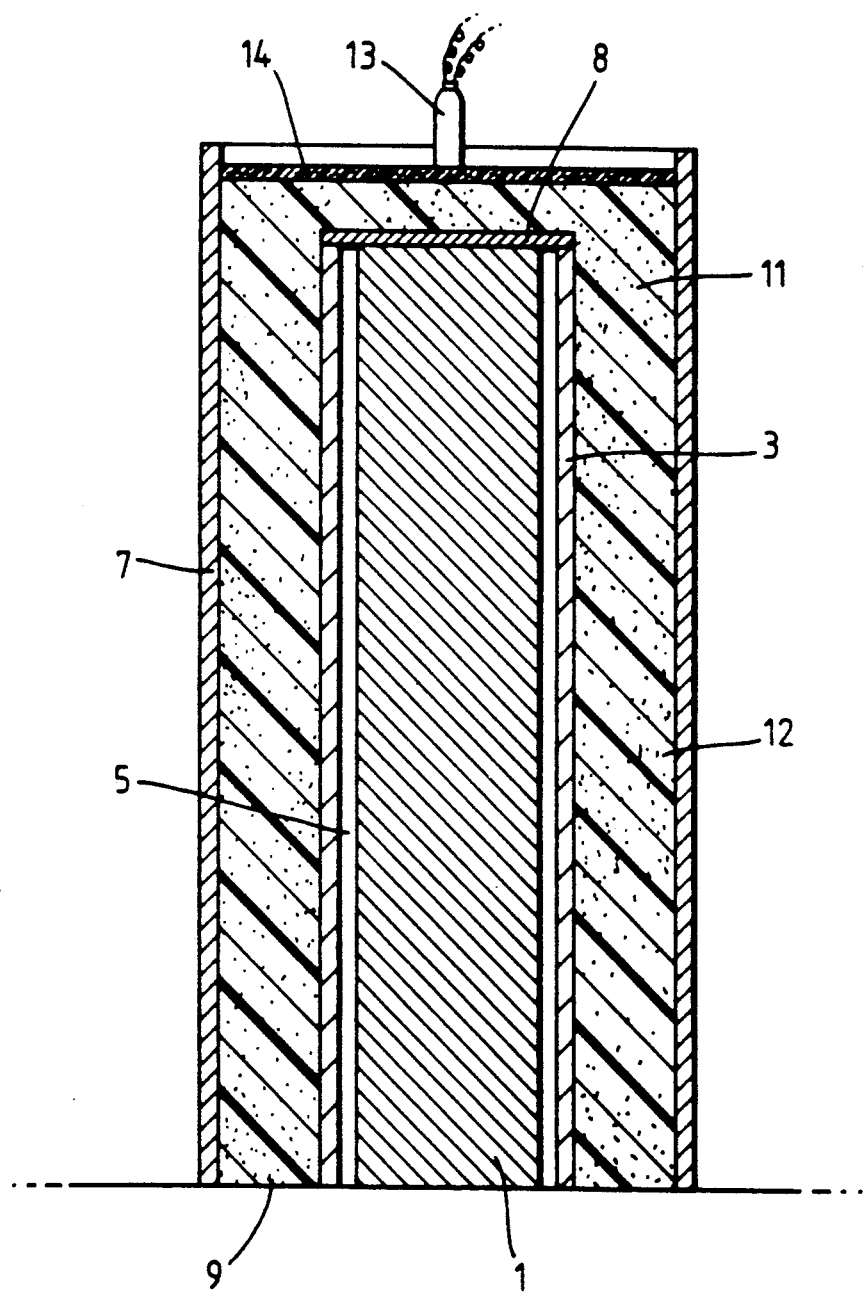
FIG. 1—is a side cross-sectional view of an arrangement for use in performing a first step of a method according to the present invention prior to implosion.

Referring to FIG. 1, a substantially solid billet 1 of corrosion resistant metal, e.g. nickel alloy, is placed in a vertical position, and a steel tube 3 placed over, and concentric with, the billet 1, so as to form an annular gap 5 between the billet 1 and the tube 3. A cardboard or plastic tube 7 is placed concentrically around the steel tube 3 so as to form a second annular gap 9 between the steel tube 3 and tube 7. A cardboard or plastic disc 8 is placed on the top of the steel tube 3 so as to close the annular gap 5. The second annular gap 9 is then filled with explosive 11 so as to form a column of explosive 12 covering the sides and top of the tube 3, and a disc 14 of plastic explosive placed over the upper end of the explosive column 12.

The explosive column 12 can be initiated by a detonator 13 positioned on the upper surface of the disc 14. A collision front, between the outer surface of the billet 1 and the inner surface of the steel tube 3, will form and travel down the annular gap 5 so as to form an explosively bonded composite 15 from the billet 1 and steel tube 3 as the detonation front of the explosive 12 proceeds.

In typical applications the dimensions of the set-up of FIG. 1 may be as follows. The billet 1 may have an outer diameter of around 11" (279.4 mm), the steel tube 3 may have a thickness of around 0.5"–0.625" (12.7 mm–15.875 mm), the annular gap 5 (i.e. stand-off distance) may be around 0.375" (9.525 mm) and the length of the billet 1 and steel tube 3 may be around 118" (3000 mm). The explosive column 12 will have an explosive-to-metal mass ratio as appropriate for the combination of metals to be bonded, as will be known to those practiced in the art.

Referring to FIG. 2, the bonded composite 15 is subsequently cut into suitable lengths which are then heated. A heated billet is placed in a container 17 of a hot extrusion press (not fully shown), and a mandrel 19 is then located concentrically within an extrusion die 21, whereupon pressure is applied to the composite by a ram 23, forcing the composite 15 between the mandrel and die 21 to emerge as an extruded shell 25 of reduced diameter. The extruded shell 25 may then be cut into appropriate lengths.

Referring to FIG. 3, a length of the extruded shell 25, consisting of an inner liner 29 of corrosion resistant metal to which is bonded an outer layer 31 of a second metal, is placed concentrically within the bore of a hollow billet 33 of metal so as to form an interface 35 between the shell 25 and a billet 33.

The hollow billet 33 is made of a metal which is either identical to, or compatible with the outer layer 31 of the extruded shell 25. The interface 35 is sealed by fusion welds 37, 38 at each end so as to form a loose composite billet 39. The fusion welds 37, 38 prevent oxidation of the metal surfaces at the interface 35 during subsequent heating of the loose composite billet 39.

Figure 4:
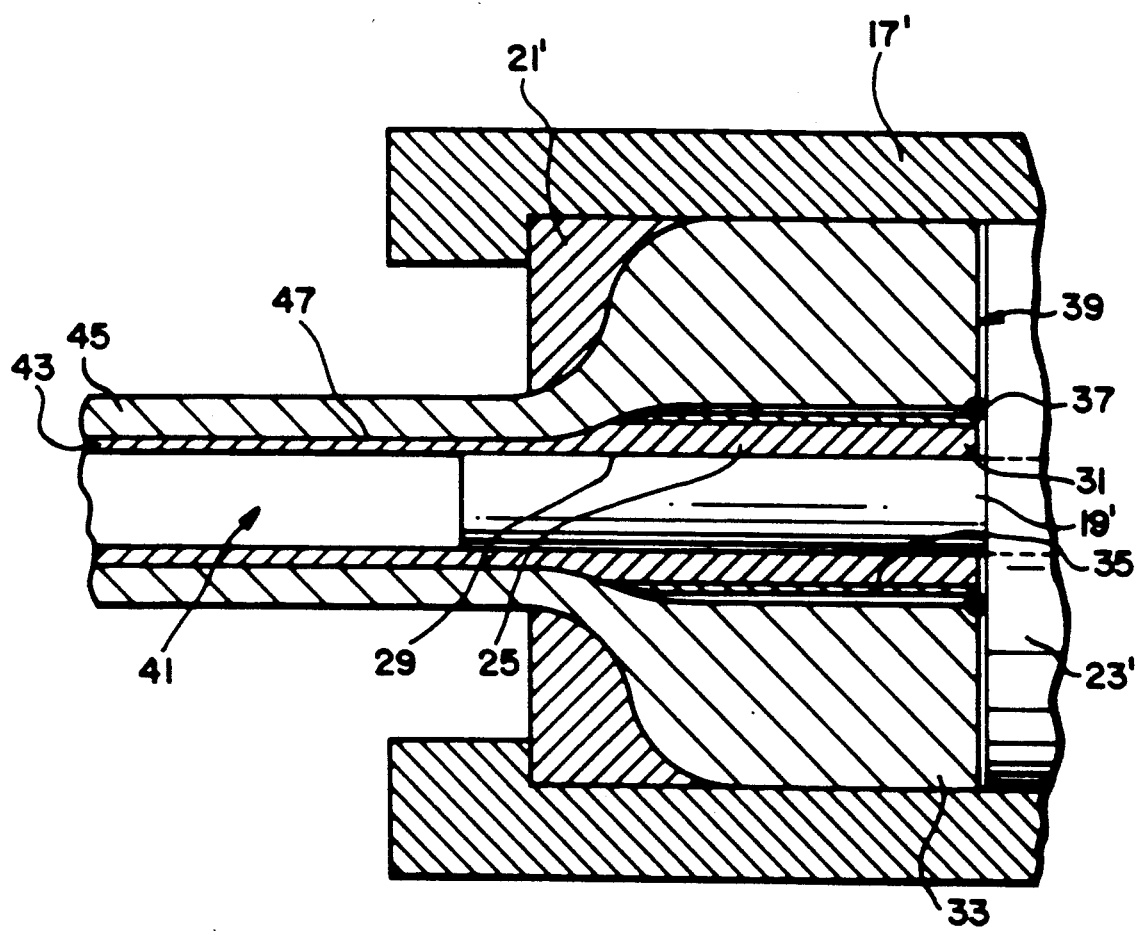
FIG. 4—is a side cross-sectional view of a length of the composite being co extruded to form a bi-metal tube in accordance with a final step of the method of the present invention.

Referring to FIG. 4, the composite billet 39, of appropriate length and outer diameter, may then be heated and placed in a container 17' of a hot extrusion press (not fully shown). A mandrel 19' is brought forward within the billet 39, the mandrel 19' then being positioned concentrically within an extrusion die 21' whereupon a ram 23' exerts pressure upon the loose composite billet 39. In this way the billet 39 is forced between the mandrel 19' and die 21', in so doing forming a bond (not shown) between the compatible outer metal layer 31 of the shell 25 and the hollow billet 33 to form an extruded shell 41. The extruded shell 41, i.e. bi-metal tube, thus consists of a corrosion resistant metal inner layer 43 bonded to a single outer metal substrate 45 at an interface 47.

Utilizing the method described above, an original substantially solid billet 1 of perhaps around 3 meters in length may provide three explosively bonded composites 15, each of which may be hot extruded into typically 3 meter length composite extruded shells 25. Each shell 25 may then be divided into three to produce a total of nine shells 25, each of which may be placed within the bore of a hollow billet 33 and co-extruded to a typical length of 12 meters.

The present invention thus provides a method for making bi-metal tubes which offers a number of significant advantages to methods previously known. For example, the present invention increases the available cladding capacity by 900%, reduces the number of joints required in a given length of pipeline by increasing the tube length, and improves dimensional accuracy since the composite shell is extruded to size rather than explosively bonded. It should, however, be appreciated that the embodiment disclosed herein is given by way of example only, and is not meant to limit the scope of the invention in any way.

I claim:

1. A method for producing a bi-metal tube comprising the steps of:

providing a tube of a first metal;

providing a substantially incompressible billet of a second metal;

explosively bonding an interior cylindrical surface of the tube of the first metal to an exterior cylindrical surface of the billet of the second metal by imploding the tube of the first metal onto the substantially incompressible billet and thereby forming a cylindrical bonded composite;

forming an extruded bi-metal shell by hot extruding the cylindrical bonded composite at an elevated temperature;

dividing the extruded bi-metal shell into a plurality of lengths;

placing a length of the extruded bi-metal shell within a bore of a hollow billet of a metal which is the same as, or compatible with the first metal for bonding thereto on co-extrusion at elevated temperature, and thus forming an annular interface between an exterior cylindrical surface of the extruded bi-metal shell and an interior cylindrical surface of the hollow billet;

sealing the annular interface and thereby forming an assembled composite; and co-extruding the assembled composite at an elevated temperature to form the bi-metal tube.

2. A method as claimed in claim 1, wherein the step of providing the substantially incompressible billet includes providing one of a solid cylinder and a thick-walled tube.

3. A method as claimed in claim 1 or 2, wherein the step of providing the substantially incompressible billet of the second metal includes providing a billet formed of a corrosion resistant metal.

4. A method as claimed in claim 3, wherein the step of providing the substantially incompressible billet of the second metal includes providing a billet formed of a corrosion resistant metal that is a high nickel alloy.

5. A method for producing an extruded bi-metal shell including the steps of:

explosively bonding an interior cylindrical surface of a tube of a first metal to an exterior cylindrical surface of a substantially incompressible billet of a second metal by imploding the tube of the first metal onto the substantially incompressible billet, thereby forming a cylindrical bonded composite; and hot extruding a length of the cylindrical bonded composite at an elevated temperature to form the bi-metal shell.

* * * * *